US012731699B2

(12) United States Patent
Yoshida et al.

(10) Patent No.: US 12,731,699 B2
(45) Date of Patent: Sep. 8, 2026

(54) NUCLEAR POWER GENERATION SYSTEM AND NUCLEAR REACTOR UNIT

(71) Applicant: MITSUBISHI HEAVY INDUSTRIES, LTD., Tokyo (JP)

(72) Inventors: Kazuhiro Yoshida, Tokyo (JP); Chikara Kurimura, Tokyo (JP); Tatsuo Ishiguro, Tokyo (JP); Hideyuki Uechi, Tokyo (JP); Ryusuke Kimoto, Tokyo (JP); Yoshiteru Komuro, Tokyo (JP); Hiroyuki Nakaharai, Tokyo (JP); Tadakatsu Yodo, Tokyo (JP); Hideaki Ikeda, Tokyo (JP); Satoru Kamohara, Tokyo (JP); Shohei Otsuki, Tokyo (JP); Wataru Nakazato, Tokyo (JP); Yohei Kamiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 292 days.

(21) Appl. No.: 17/432,547

(22) PCT Filed: Feb. 10, 2020

(86) PCT No.: PCT/JP2020/005195
§ 371 (c)(1),
(2) Date: Aug. 20, 2021

(87) PCT Pub. No.: WO2020/202806
PCT Pub. Date: Oct. 8, 2020

(65) Prior Publication Data

US 2022/0148745 A1 May 12, 2022

(30) Foreign Application Priority Data

Mar. 29, 2019 (JP) ................................ 2019-067239

(51) Int. Cl.
*G21C 15/12* (2006.01)

(52) U.S. Cl.
CPC .................................... *G21C 15/12* (2013.01)

(58) Field of Classification Search
CPC .... F28F 2013/001; F28F 13/14; G21C 15/12; G21C 15/257; G21C 11/083–085;
(Continued)

(56) References Cited

U.S. PATENT DOCUMENTS 3,302,042 A * 1/1967 Grover ..................... G21D 7/04 976/DIG. 188
3,397,114 A * 8/1968 Deighton ............. G21C 13/036 976/DIG. 173

(Continued)

FOREIGN PATENT DOCUMENTS

CN 203964740 U * 11/2014 ......... F28D 15/0275
CN 109243653 A * 1/2019 ............... G21D 7/04

(Continued)

OTHER PUBLICATIONS

Office Action dated Mar. 29, 2022, issued in counterpart JP application No. 2019-067239, with English translation. (6 pages).

(Continued)

*Primary Examiner* — Jinney Kil
(74) *Attorney, Agent, or Firm* — WHDA, LLP

(57) ABSTRACT

A nuclear power generation system includes a nuclear reactor that includes a reactor core fuel and a nuclear reactor vessel, the nuclear reactor vessel covering a surrounding of the reactor core fuel, shielding a space in which the reactor core fuel is present, and shielding radioactive rays; a heat conductive portion that is disposed in at least a part of the nuclear reactor vessel to transfer heat inside the nuclear reactor vessel to an outside by solid heat conduction; a heat exchanger that performs heat exchange between the heat conductive portion and a refrigerant; a refrigerant circulation unit that circulates the refrigerant passing through the heat
(Continued)

exchanger; a turbine that is rotated by the refrigerant circulated by the refrigerant circulation unit; and a generator that rotates integrally with the turbine.

21 Claims, 10 Drawing Sheets

(58) Field of Classification Search
CPC ............ G21C 13/028–036; G21D 5/08; F28D 2013/001; F28D 13/14
USPC ......................................... 376/367, 294, 298
See application file for complete search history.

(56) References Cited

U.S. PATENT DOCUMENTS 3,547,778 A * 12/1970 Ott ........................... G21D 7/04 136/202
3,779,865 A * 12/1973 Schafstall ................ G21C 9/00 976/DIG. 173
3,782,449 A * 1/1974 Busse ..................... H01J 45/00 165/274
3,816,246 A * 6/1974 Kumpf ................. G21C 13/073 976/DIG. 173
4,478,784 A * 10/1984 Burelbach ................ G21C 1/03 165/274
4,948,938 A * 8/1990 Vignes ................. G21C 13/032 219/121.14
5,684,848 A * 11/1997 Gou ........................ F28D 15/04 376/367
11,158,432 B1 * 10/2021 Reid .................... G21C 15/257
2011/0194663 A1 * 8/2011 Hori ......................... F16L 5/022 376/352
2015/0217538 A1 * 8/2015 Zhamu ................... B82Y 30/00 156/264
2016/0027536 A1 1/2016 Mcclure et al.
2016/0049210 A1 2/2016 Filippone et al.
2018/0033501 A1 * 2/2018 Kimura .................... G21C 3/22
2018/0075931 A1 * 3/2018 Arafat ...................... G21C 1/12
2018/0226159 A1 8/2018 Sterbentz et al.
2019/0024985 A1 * 1/2019 Wadley ................... E01C 11/26
2019/0096536 A1 * 3/2019 Arafat ..................... F28D 15/06
2022/0399135 A1 * 12/2022 Morris ..................... G21D 7/04

FOREIGN PATENT DOCUMENTS

| | | | | | |
|---|---|---|---|---|---|
| JP | S63-083692 | A | | 4/1988 | |
| JP | S63223593 | A | * | 9/1988 | |
| JP | 2010278108 | A | * | 12/2010 | ......... F28D 15/0275 |
| JP | 2014-119429 | A | | 6/2014 | |
| JP | 2016-515191 | A | | 5/2016 | |
| RU | 2510652 | C1 | * | 4/2014 | |
| WO | WO-2019046831 | A1 | * | 3/2019 | ................ F02C 1/05 |

OTHER PUBLICATIONS

English translation of International Search Report dated Apr. 21, 2020, issued in counterpart PCT/JP2020/005195. (2 pages).
Written Opinion dated Apr. 21, 2020, issued in counterpart PCT/JP2020/005195, with English Translation. (10 pages).

* cited by examiner

NUCLEAR POWER GENERATION SYSTEM AND NUCLEAR REACTOR UNIT

FIELD

The present invention relates to a nuclear power generation system and a nuclear reactor unit.

BACKGROUND

In a nuclear power generation system that uses nuclear fuels and generates power using heat of nuclear reaction, heat generated in a nuclear reactor is recovered in a primary cooling system, in which primary coolant circulates between the nuclear reactor and a secondary cooling system, to be subjected to heat exchange between the primary coolant and secondary coolant, and a turbine provided in the secondary cooling system is rotated by energy of the secondary coolant, resulting in generating power.

In Patent Literature 1, a structure is described in which heat generated in a nuclear reactor is recovered by heat pipes to be subjected to heat exchange between the heat pipes and a cooling system in which refrigerant circulates, and power is generated by heat energy recovered by the cooling system. The structure described in Patent Literature 1 requires no primary coolant, thereby making it possible to increase reliability of a nuclear power generation system and downsize the nuclear power generation system.

CITATION LIST

Patent Literature

Patent Literature 1: United State Patent Application Publication No. 2016/0027536

SUMMARY

Technical Problem

In the nuclear power generation system, radioactive rays are generated in the nuclear reactor. In the structure described in Patent Literature 1 in which the heat pipes are used, a medium after heat exchange with fuels moves inside the heat pipes, when a damage occurs in the heat pipes, the medium irradiated with the radioactive rays in the heat pipes leaks in a system continuing to the turbine. When the polluted medium intrudes inside the heat pipes, a medium in the cooling system is irradiated with radioactive rays that are not shielded by the heat pipes.

The present invention solves the problems described above, and an object of the present invention is to provide a nuclear power generation system and a nuclear reactor unit that can generate power while maintaining a high radioactive ray shielding performance.

Solution to Problem

In order to achieve the object, a nuclear power generation system according to an aspect of the present invention includes a nuclear reactor that includes a reactor core fuel and a nuclear reactor vessel, the nuclear reactor vessel covering a surrounding of the reactor core fuel, shielding a space in which the reactor core fuel is present, and shielding radioactive rays; a heat conductive portion that is disposed in at least a part of the nuclear reactor vessel to transfer heat inside the nuclear reactor vessel to an outside by solid heat conduction; a heat exchanger that performs heat exchange between the heat conductive portion and a refrigerant; a refrigerant circulation unit that circulates the refrigerant passing through the heat exchanger; a turbine that is rotated by the refrigerant circulated by the refrigerant circulation unit; and a generator that rotates integrally with the turbine.

It is preferable that the heat conductive portion includes a first heat conductive portion that is joined to the nuclear reactor vessel and shields passing-through neutrons; and a second heat conductive portion that is connected to the first heat conductive portion and disposed on a path of the solid heat conduction between the first heat conductive portion and the refrigerant circulation unit, and the second heat conductive portion has a higher thermal conductivity than a thermal conductivity of the first heat conductive portion.

It is preferable that the first heat conductive portion is formed of a material having a higher neutron shielding performance than a neutron shielding performance of the second heat conductive portion.

It is preferable that the second heat conductive portion is a material having an anisotropic thermal conductivity, and has a higher thermal conductivity in a direction from the first heat conductive portion toward the heat exchanger than a thermal conductivity in another direction.

It is preferable that the second heat conductive portion includes graphene.

It is preferable that the second heat conductive portion has a cross-sectional area that is reduced toward the heat exchanger.

It is preferable that a heat pipe is further included that is disposed inside the nuclear reactor vessel of the nuclear reactor, the heat pipe being partly in contact with the heat conductive portion and filled with a heat medium.

It is preferable that a heat pipe is further included that is disposed inside the nuclear reactor vessel of the nuclear reactor, is partly in contact with the first heat conductive portion, and is filled with a heat medium, and a part of the second heat conductive portion is inserted into the first heat conductive portion, and the second heat conductive portion overlaps with the heat pipe in an extending direction of the second heat conductive portion.

It is preferable that a part of the first heat conductive portion is inserted into the heat exchanger.

It is preferable that a protecting portion is further included that is disposed between the heat conductive portion and the refrigerant circulation unit and in contact with the heat conductive portion.

It is preferable that the nuclear reactor vessel is formed of a material having a lower thermal conductivity than a thermal conductivity of the heat conductive portion.

It is preferable that the heat conductive portion is provided at each of a plurality of positions of the nuclear reactor vessel.

It is preferable that the nuclear reactor includes a control unit that controls reaction of the reactor core fuel, and the heat conductive portion is disposed in a region different from a region in which the control unit of the nuclear reactor vessel is disposed.

In order to achieve the object, a nuclear reactor unit according to an aspect of the present invention includes a nuclear reactor vessel that covers a reactor core fuel and a surrounding of the reactor core fuel, shields a space in which the reactor core fuel is present, and shields radioactive rays; and a heat conductive portion that is disposed in at least a part of the nuclear reactor vessel to transfer heat inside the nuclear reactor vessel to an outside by solid heat conduction.

It is preferable that the heat conductive portion includes a first heat conductive portion that is joined to the nuclear reactor vessel and shields passing-through neutrons; and a second heat conductive portion that is connected to the first heat conductive portion and disposed on a path of the solid heat conduction between the first heat conductive portion and a solid heat conduction target, and the second heat conductive portion has a higher thermal conductivity than a thermal conductivity of the first heat conductive portion.

It is preferable that the first heat conductive portion is formed of a material having a higher neutron shielding performance than a neutron shielding performance of the second heat conductive portion.

It is preferable that the second heat, conductive portion is a material having an anisotropic thermal conductivity, and has a higher thermal conductivity in a direction from the first heat conductive portion toward the heat exchanger than a thermal conductivity in another direction.

It is preferable that the second heat conductive portion includes graphene.

It is preferable that a heat pipe is further included that is disposed inside the nuclear reactor vessel, is partly in contact with the heat conductive portion, and is filled with a heat medium.

It is preferable that a heat pipe is further included that is disposed inside the nuclear reactor vessel of a nuclear reactor, is partly in contact with the first heat conductive portion, and is filled with a heat medium, and a part of the second heat conductive portion is inserted into the first heat conductive portion, and the second heat conductive portion overlaps with the heat pipe in an extending direction of the second heat conductive portion.

It is preferable that a part of the first heat conductive portion is inserted into a heat transfer target.

Advantageous Effects of Invention

The invention can generate power while maintaining a high radioactive ray shielding performance.

DESCRIPTION OF EMBODIMENT

The following describes an embodiment according to the invention in detail with reference to the accompanying drawings. The embodiment does not limit the invention. The constituent elements described in the following embodiment include those easily replaceable by those skilled in the art or substantially identical ones.

Figure 1:
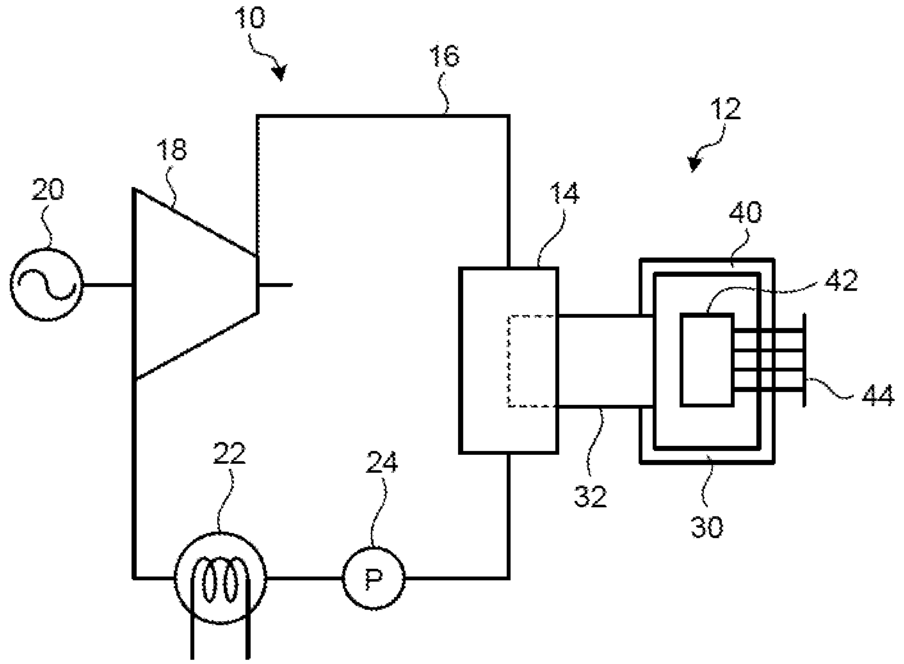
FIG. 1 is a schematic diagram illustrating a schematic structure of a nuclear power generation system according to an embodiment.

FIG. 1 is a schematic diagram illustrating a schematic structure of a nuclear power generation system according to the embodiment. As illustrated in FIG. 1, a nuclear power generation system 10 has a nuclear reactor unit 12, a heat exchanger 14, a refrigerant circulation unit 16, a turbine 18, a generator 20, a cooler 22, and a compressor 24.

The nuclear reactor unit 12 has a nuclear reactor 30 and a heat conductive portion 32. The nuclear reactor 30 has a nuclear reactor vessel 40, a reactor core fuel 42, and a control unit 44. The nuclear reactor vessel 40 stores therein the reactor core fuel 42 in a sealed condition. The nuclear reactor vessel 40 is provided with an open-close portion so as to enable inserting the reactor core fuel 42 to be placed inside the nuclear reactor vessel 40 and removing the reactor core fuel 42 from the nuclear reactor vessel 40, The open-close portion is a lid, for example. The nuclear reactor vessel 40 can maintain the sealed condition even when the inside thereof becomes high temperature and high pressure due to a nuclear reaction occurring inside thereof. The nuclear reactor vessel 40 is formed of a material having a neutron ray shielding performance with a thickness that prevents neutron rays generated inside thereof from leaking to an outside thereof. The nuclear reactor vessel 40 is formed of concrete, for example. The nuclear reactor vessel 40 may include an element having a high neutron ray shielding performance such as boron.

The reactor core fuel 42 includes a plurality of fuel rods **42*a* and a reactor core heat conductor 42*b*. The fuel rods 42*a* are arranged with a certain distance therebetween. The reactor core heat conductor 42*b* has the fuel rods 42*a* arranged inside thereof. The reactor core heat conductor 42*b* covers the surroundings of the fuel rods 42*a*. The reactor core heat conductor 42*b* may use graphite or silicon carbide, for example. The reactor core heat conductor 42*b* may have a layered structure in which metal covers the surface of graphite or silicon carbide. The reactor core heat conductor 42*b* may be provided for each of the fuel rods 42*a*. The reactor core fuel 42 generates reaction heat as a result of nuclear reaction in the fuel rods 42*a***.

The control unit 44 has shielding materials that can be moved between the fuel rods **42*a* of the reactor core fuel 42. The shielding materials are what are called control rods that have a function to shield radioactive rays and suppress nuclear reaction. The nuclear reactor 30 moves the control unit 44** to adjust the position of the shielding materials, thereby controlling the reaction of the reactor core fuel.

Figure 2:
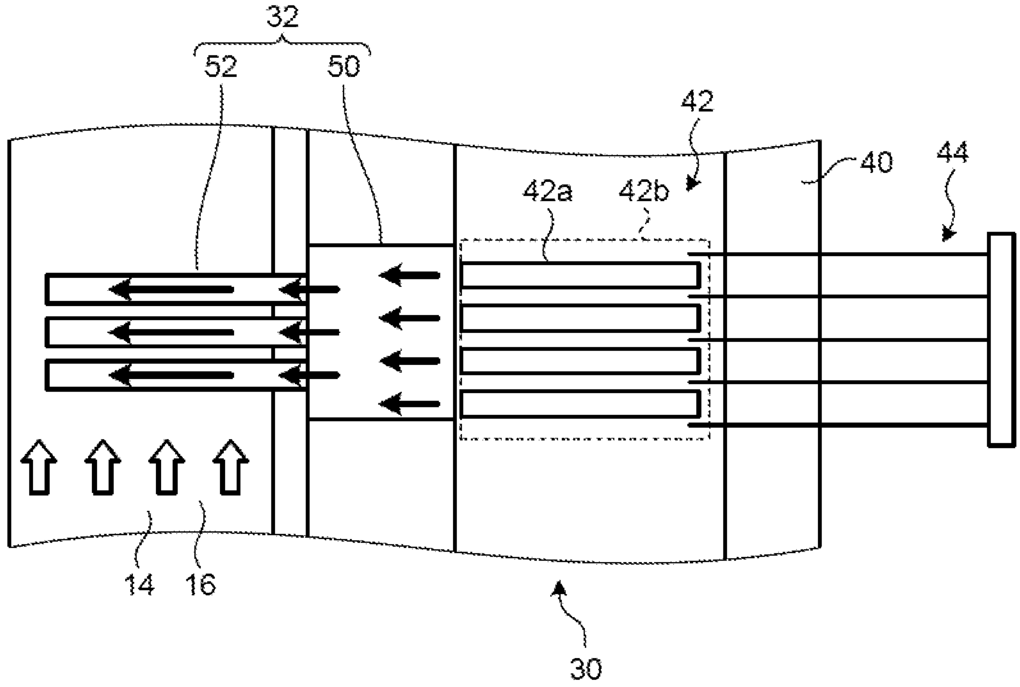
FIG. 2 is a schematic diagram illustrating an example of a heat conductive portion.

In FIGS. 1 and 2 illustrating the embodiment, the fuel rods 42*a* are illustrated in such a direction that the fuel rods 42*a* are inserted from the lateral direction. The direction of the fuel rods 42*a* and the direction of the control rods to be inserted between the fuel rods 42*a*, of the control unit 44 are not limited to specific directions. The nuclear reactor unit 12 may have a structure that allows the control rods to be inserted from any direction, for example, from above in the vertical direction, below in the vertical direction, the horizontal direction, and an oblique direction, when the nuclear reactor unit 12 employs a structure in which the control rods of the control unit 44 are inserted from above in the vertical direction, the control rods can also be inserted between the fuel rods 42*a* by gravity.

As illustrated in FIGS. 1 and 2, the heat conductive portion 32 is connected to both the nuclear reactor 30 and the heat exchanger 14. The heat conductive portion 32 transfers heat by solid heat conduction. That is, the heat conductive portion 32 transfers heat without use of a heat medium (fluid). Specifically, the heat conductive portion 32 transfers heat generated in the reactor core fuel 42 to the heat exchanger 14 by the solid heat conduction.

As illustrated in FIG. 2, the heat conductive portion 32 has a first heat conductive portion 50 and second heat conductive portions 52. The first heat conductive portion 50 is a solid and a part of the nuclear reactor vessel 40. That is, the first heat conductive portion 50 is a part of the nuclear reactor vessel 40 and exposed to an inside space of the nuclear reactor vessel 40. The first heat conductive portion 50 is exposed to a space in which the reactor core fuel 42 is disposed. The first heat conductive portion 50 is also exposed to the outside of the nuclear reactor vessel 40. The first heat conductive portion 50 absorbs heat inside the nuclear reactor vessel 40 and transfers the absorbed heat to the outside of the nuclear reactor vessel 40. The first heat conductive portion 50 is a material having a higher thermal conductivity than that of the nuclear reactor vessel 40. The material has high durability against an operating temperature even when temperature rises due to heat generated in the reactor core fuel 42 of the nuclear reactor vessel 40. The first heat, conductive portion 50 has a capability to shield neutron rays, and hence, neutron rays reaching the first heat conductive portion 50 from the inside of the nuclear reactor vessel 40 are attenuated in the first heat conductive portion 50. As a result, neutron rays do not leak to the outside. Graphite may be used for the first heat conductive portion 50, for example.

The second heat conductive portions 52 are in contact with a surface exposed to the outside of the first heat conductive portion 50. A part of each of the second heat conductive portions 52 extends inside the heat exchanger 14. Specifically, the second heat conductive portions 52 are inserted into the refrigerant circulation unit 16, which is a part of the heat exchanger 14. The second heat conductive portions 52 in the embodiment are a plurality of rod-shaped (plate-shaped) members. One end of the member is in contact with the first heat conductive portion 50 while a certain region on the other end side of the member is inserted into the inside of the neat exchanger 16. Graphene may be used for the second heat conductive portions 52, for example.

In the nuclear reactor unit 12 with the structure described above, nuclear reaction occurs in the reactor core fuel 42 inside the nuclear reactor 30 and reaction heat is generated. The generated heat is accumulated in the inside of the nuclear reactor vessel 40, resulting in the inside becoming high temperature. In the nuclear reactor unit 12, part of heat generated in the nuclear reactor 30 is discharged to the outside via the heat conductive portion 32. Specifically, heat inside the nuclear reactor vessel 40 is absorbed by the first heat conductive portion 50. The first heat conductive portion 50 transfers heat inside the nuclear reactor vessel 40 to the second heat conductive portions 52 by the solid heat conduction. In the second heat conductive portions 52, heat supplied from the first heat conductive portion 50 is transferred to regions thereof that are in contact with the heat exchanger 16, by the solid heat conduction. The second heat conductive portions 52 heat the refrigerant flowing in the refrigerant circulation unit 16 by the heat transferred to the regions thereof that are in contact with the heat exchanger 14.

The heat exchanger 14 performs heat exchange between the heat conductive portion 32 and the refrigerant supplied from the refrigerant circulation unit 16. The heat exchanger 14 in the embodiment is composed of the second heat conductive portions 52 and a part of the refrigerant circulation unit 16. The heat exchanger 14 recovers heat of the heat conductive portion 32 using the refrigerant flowing in the refrigerant circulation unit 16. The refrigerant is heated by the heat conductive portion 32. The heat exchanger 14, the turbine 18, the cooler 22, and the compressor 24 are connected to the refrigerant circulation unit 16, which is the path for circulating the refrigerant. The refrigerant flowing in the refrigerant circulation unit 16 flows in the order of the heat exchanger 14, the turbine 18, the cooler 22, and the compressor 24. The refrigerant after passing through the compressor 24 is supplied to the heat exchanger 14.

The refrigerant after passing through the heat exchanger 14 flows into the turbine 18. The turbine 18 is rotated by energy of heated refrigerant. The turbine 18 converts energy of the refrigerant into rotation energy and absorbs energy from the refrigerant. The generator 20, which is joined to the turbine 16, rotates integrally with the turbine 18. The generator 20 generates power by rotating integrally with the turbine 18.

The cooler 22 cools the refrigerant after passing through the turbine 18. The cooler 22 is a condenser, for example, when the cooler 22 temporarily condenses a chiller or a refrigerant. The compressor 24 is a pump that pressurizes the refrigerant.

In the nuclear power generation system 10, the heat conductive portion 32 transfers heat generated by the reaction in the nuclear fuel in the nuclear reactor 12 to the heat exchanger 14, and the heat exchanger 14 heats the refrigerant flowing in the refrigerant circulation unit 16 by heat of the heat conductive portion 32. That is, the refrigerant absorbs heat transferred by the heat conductive portion 32. As a result, heat generated in the nuclear reactor 12 is transferred by the heat conductive portion 32 by the solid heat conduction and recovered by the refrigerant. After compressed by the compressor 24, the refrigerant is heated when passing through the heat conductive portion 32 to obtain the compressed and heated energy and rotate the turbine 18 by the energy. Thereafter, the refrigerant is cooled by the cooler 22 to a reference state, and supplied again to the compressor 24.

As described above, the nuclear power generation unit 10 transfers heat in the nuclear reactor 30 to the refrigerant serving as a medium rotating the turbine 18 using the heat conductive portion 32 that transfers heat by the solid heat conduction. This structure makes it possible to more reliably separate fluid polluted in the nuclear reactor 30 and the refrigerant serving as a medium rotating the turbine 18, thereby making it possible to reduce a risk of the medium rotating the turbine 18 being polluted. By providing the heat conductive portion 32 that transfers heat by the solid heat conduction, the heat conductive portion 32 can shield neutron rays.

The first heat conductive portion 50 and the second heat conductive portions 52 of the heat conductive portion 32 may be made of the identical material. It is, however, preferable that the first heat conductive portion 50 and the second heat conductive portions 52 be made of different materials so as to satisfy functions of each of them more preferably. Titanium, nickel, copper, graphite, and graphene can be used for the heat conductive portion 32, for example.

The first heat conductive portion 50 is formed of a material having a higher neutron shielding performance than that of the second heat conductive portions 52. Increasing the shielding performance of the first heat conductive portion 50 in contact with the space in which the reactor core fuel 42 is disposed, makes it possible to prevent neutron rays from leaking to the outside of the nuclear reactor vessel 40 and the first heat conductive portion 50. Graphite is preferably used for the first heat conductive portion 50. The use of graphite can increase the shielding performance and durability against heat.

The nuclear reactor vessel 40 is preferably formed of a material having a lower thermal conductivity than that of the heat conductive portion 32. This makes it possible to prevent heat inside the nuclear reactor 30 from being discharged to the outside from the portion other than the heat conductive portion 32 that is the path discharging heat to the outside.

For the second heat conductive portions 52, a material having a higher thermal conductivity than that of the first heat conductive portion 50 is preferably used. The use of the material having a high thermal conductivity for the second heat conductive portions 52, which are disposed farther on the outside of the nuclear reactor 30 than the first heat conductive portion 50 and are not required to have a high shielding performance, makes it possible to transfer heat efficiently.

A material having an anisotropic thermal conductivity is preferably used for the second heat conductive portions 52. In this case, the second heat conductive portions 52 are preferably arranged in such a direction that a thermal conductivity in the direction from the first heat conductive portion 50 to the heat exchanger 14 is higher than that in the other direction. As a result, the heat conduction in the arrow direction illustrated in FIG. 2, i.e., the transfer of heat in the direction from the first heat conductive portion 50 to the heat exchanger 14, can be performed more, thereby making it possible to transfer heat in the nuclear reactor 30 more efficiently to the heat exchanger 14. The second heat conductive portions 52 preferably include graphene. The use of graphene results in increased anisotropy. In addition, because graphene is a carbon material, the use of graphene can increase durability against heat.

Figure 3:
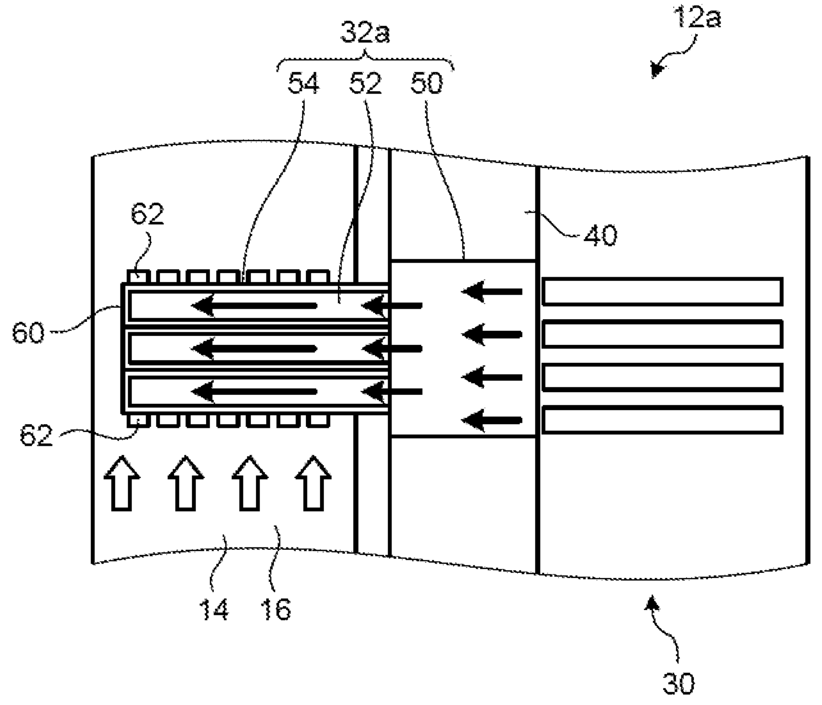
FIG. 3 is a schematic diagram illustrating another example of the heat conductive portion.

FIG. 3 is a schematic diagram illustrating another example of the heat conductive portion. A nuclear reactor unit 12*a* illustrated in FIG. 3 has the nuclear reactor 30 and a heat conductive portion 32*a*. The heat conductive portion 32*a* has the first heat conductive portion 50, the second heat conductive portions 52, and a protecting portion 54. The nuclear reactor 30, the first heat conductive portion 50, and the second heat conductive portions 52 are the same as those in the nuclear reactor unit 12. The descriptions thereof are thus omitted.

The protecting portion 54 is in contact with the portions exposed inside the refrigerant circulation unit 16 of the second heat conductive portions 52. The protecting portion 54 is joined to the refrigerant circulation unit 16 and a part of the wall of the flow path of the refrigerant circulation unit 16. The protecting portion 54 is disposed between the second heat conductive portions 52 of the heat conductive portion 32*a* and the refrigerant circulation unit 16, and in contact with the heat conductive portion 32*a*.

The protecting portion 54 has a tubular portion 60 into which the rod-shaped or plate-shaped second heat conductive portions 52 are inserted, and fins 62 arranged around the tubular portion 60. The tubular portion 60 of the protecting portion 54 is in contact with the second heat conductive portions 52, resulting in heat of the second heat conductive portions 52 being transferred to the protecting portion 54 by the solid heat conduction. The fins 62 increase a contact area between the protecting portion 54 and the refrigerant, thereby mating it easy for the refrigerant to recover heat of the protecting portion 54.

The heat conductive portion 32*a* is joined to the refrigerant circulation unit 16. Providing the protecting portion 54 that is a part of the wall of the flow path of the refrigerant circulation unit 16, allows the protecting portion 54 and the second heat conductive portions 52 to be attached to and removed from each other. As a result, even when the second heat conductive portions 52 are removed from the refrigerant circulation unit 16, the refrigerant circulation unit 16 remains as a closed pipe. This makes it possible to remove the nuclear reactor unit 12*a* from the refrigerant circulation unit 16.

Figure 4:
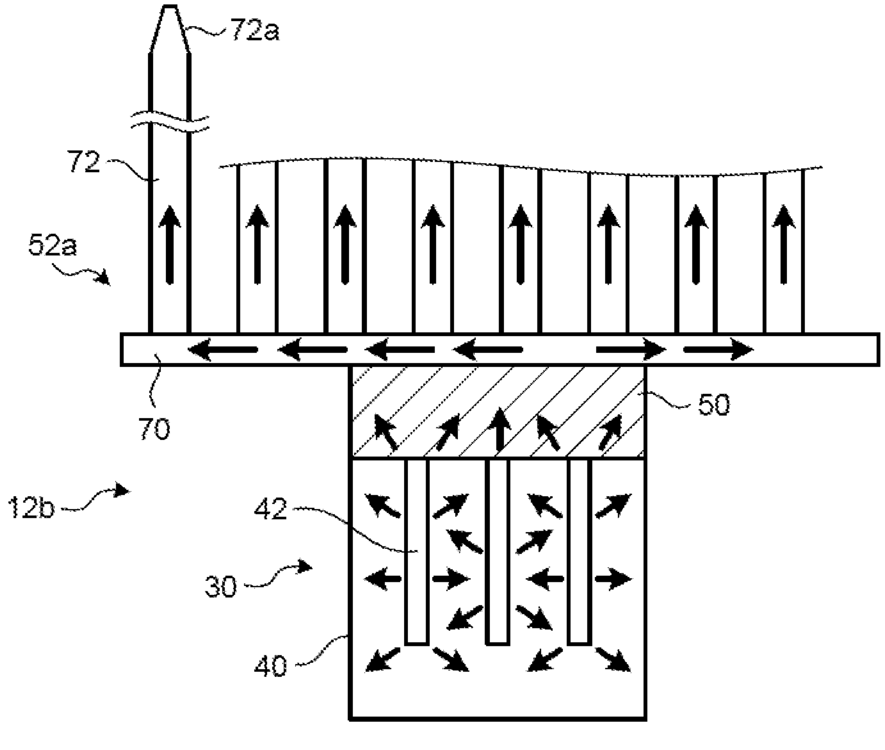
FIG. 4 is a schematic diagram illustrating another example of the heat conductive portion.

The following describes the more specific structure of the heat conductive portion. FIGS. 4 to 11 are other examples of the heat conductive portion. The following structures of the heat conductive portion can be combined as appropriate. FIG. 4 is a schematic diagram illustrating another example of the heat conductive portion. A second heat conductive portion 52*a* of a nuclear reactor unit 12*b* illustrated in FIG. 4 has a first member 70 and a plurality of second members 72. The first member 70 is in contact with the first heat conductive portion 50 and extends in a direction parallel to the flat surface of the first heat conductive portion 50. The first member 70 has a wider width than that of the first heat conductive portion 50. The second members 72 extend in parallel with one another and arranged in a direction intersecting the first member 70. The end on the first heat conductive portion 50 side of the second member 72 is in contact with the first member 70 while the other end thereof is in contact with the heat exchanger 14. The second member 72 has the other end portion 72*a* having the width that is reduced toward the front end thereof.

The second heat conductive portion 52*a* illustrated in FIG. 4 has the first member 70 that has a wider heat-transfer surface than that of the first heat conductive portion 50, thereby making it possible to make arrangement of more second members 72 that are in contact with the heat exchanger 14. As a result, this structure can transfer much more heat of the nuclear reactor 30 to the heat exchanger. The end portion 72*a* has a pointed shape, thereby making it possible to transfer heat efficiently at the center even when the second heat conductive portion 52*a* has anisotropic thermal conduction.

Figure 5:
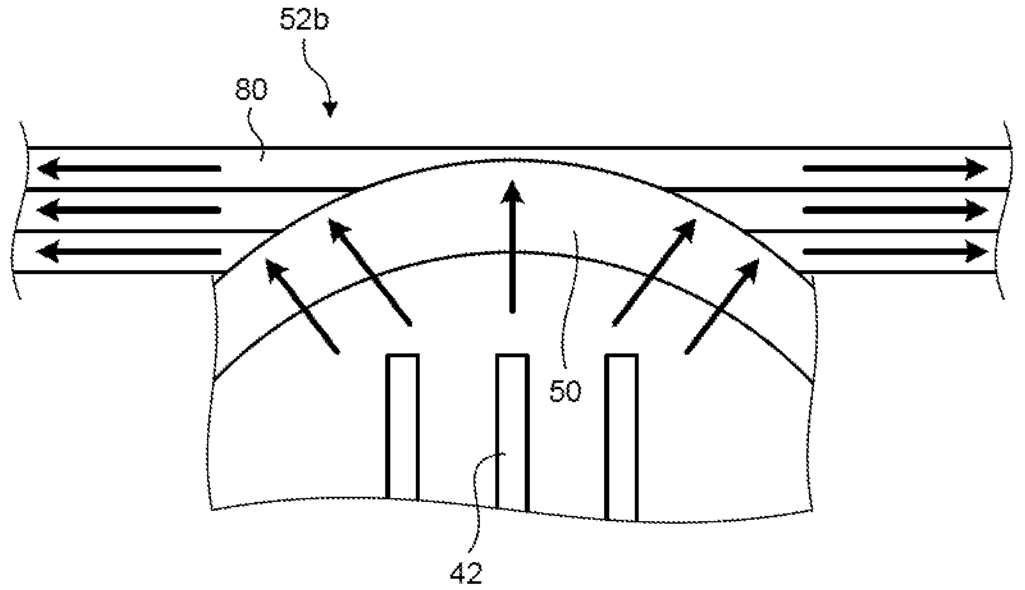
FIG. 5 is a schematic diagram illustrating another example of the heat conductive portion.

FIG. 5 is a schematic diagram illustrating another example of the heat conductive portion. A second heat conductive portion 52*b* illustrated in FIG. 5 has a plurality of first members 80. The first members 80 are provided on the curved surface of the first heat conductive portion 50.

The multiple first members 30 are arranged at different positions on the curved surface of the first heat conductive portion 50 and in parallel with one another. The first members 80 arranged on the outside in the radius direction of the curved surface of the first heat conductive portion 50 are directed in such a manner to extend in a tangential direction of the curved surface. As a result, heat of the first heat conductive portion 50 can be more efficiently conducted by the first members 30.

Figure 6:
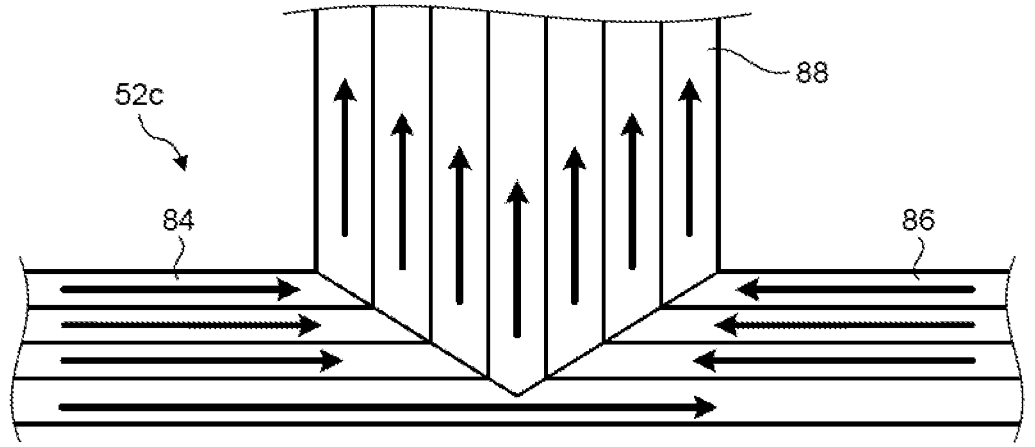
FIG. 6 is a schematic diagram illustrating another example of the heat conductive portion.

FIG. 6 is a schematic diagram illustrating another example of the heat conductive portion. A second heat conductive portion 52*c* illustrated in FIG. 6 is an example of a shape of a bent portion. The second heat conductive portion 52*c* is composed of a plurality of first members 84, a plurality of first members 86, and a plurality of second members 39 that form a T-shape. The first members 84 and the first members 86 are arranged such that their ends face each other. The second members 38 are connected to the connection portion between the first members 84 and 86 in a direction orthogonal to the extending direction of the first members 84 and 86. In this case, the connection ends of the first members 84 and 86, and the second members 88 are preferably shaped to have a surface tilted with respect to the direction orthogonal to the extending direction. As a result, areas of the joint surface between the first members 84 and the second members 88 and the joint surface between the first members 86 and the second members 88 can be increased, thereby making it possible to efficiently transfer heat.

Figure 7:
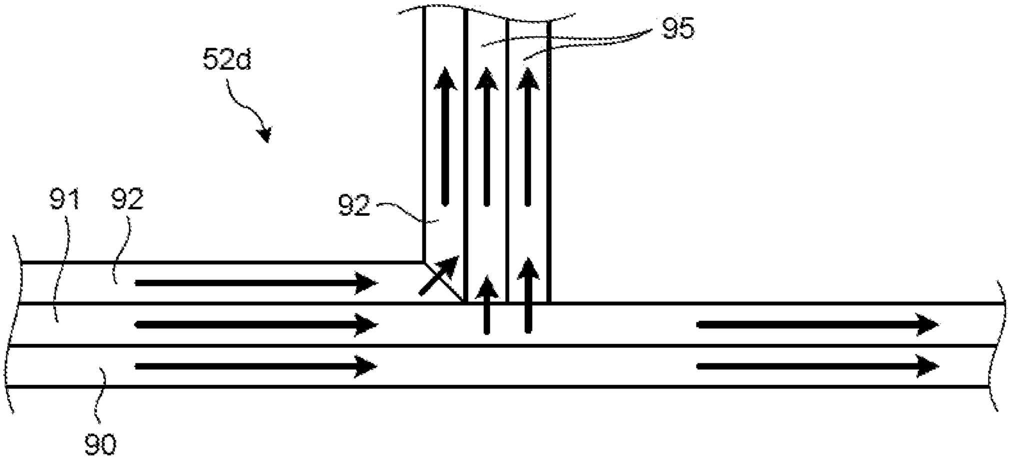
FIG. 7 is a schematic diagram illustrating another example of the heat conductive portion.

FIG. 7 is a schematic diagram illustrating another example of the heat conductive portion. A second heat conductive portion 52*d* illustrated in FIG. 7 is an example of the shape of the bent portion. The second heat conductive portion 52*d* has first members 90, 91, and 92 arranged in parallel with one another, and second members 94 and 95 that are orthogonal to the first members 90, 91, and 92. The first members 90 and 91 extend far from the portion connected to the second members 94 and 95 while the end surface of the first member 92 is in contact with the second member 94. The end of the second member 94 has a tilted surface, which is connected to the first member 92. The second members 95 are joined to the side surface of the first member 91. The members conducting heat are joined as described above, thereby making it possible to transfer heat in two directions. The second member 95 can transfer heat of the first member 91 by being connected to the first member 91.

Figure 8:
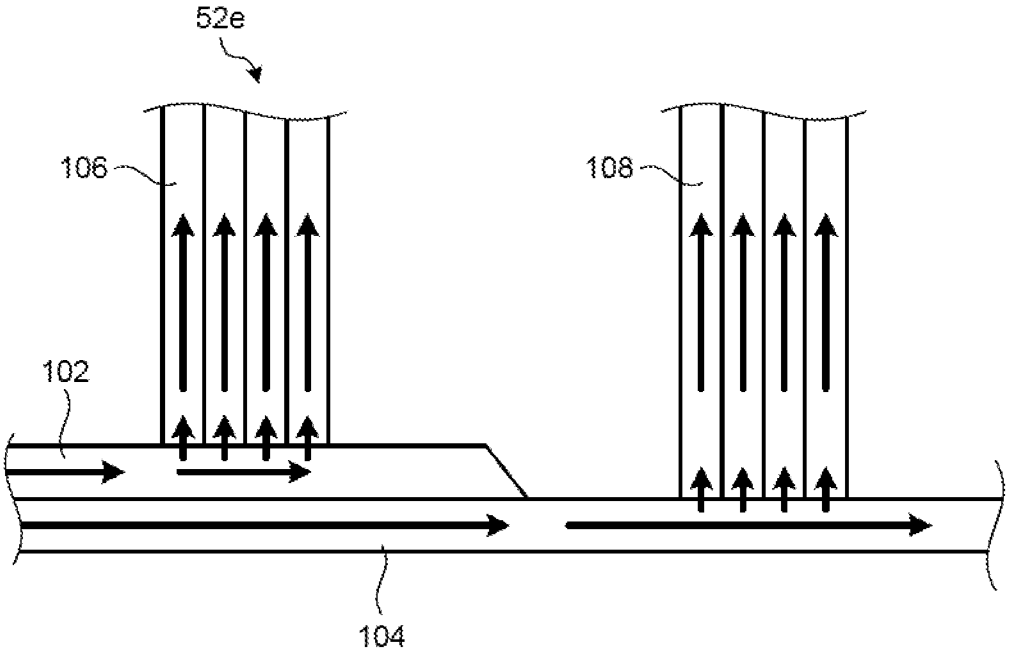
FIG. 8 is a schematic diagram illustrating another example of the heat conductive portion.

FIG. 8 is a schematic diagram illustrating another example of the heat conductive portion. A second heat conductive portion 52*e* illustrated in FIG. 8 is an example of the shape of the bent portion. The second heat conductive portion 52*e* has first members 102 and 104 arranged in parallel with each other, and second members 106 and 108 that are orthogonal to the first members 102 and 104. The second members 106 are joined to the side surface of the first member 102. The second members 108 are joined to the side surface of the first member 104. The first member 102 is terminated at the portion between the position joined to the second member 106 and the position where the second members 108 and the first member 104 are joined. As described above, the first member 102 and the first member 104 that are joined to the second members 106 and the second members 108 are different members, thereby making it possible to transfer heat conducted by the first member 102 and the first member 104 to the first members 106 and the first members 108, respectively, to increase the heat amount to be transferred.

Figure 9:
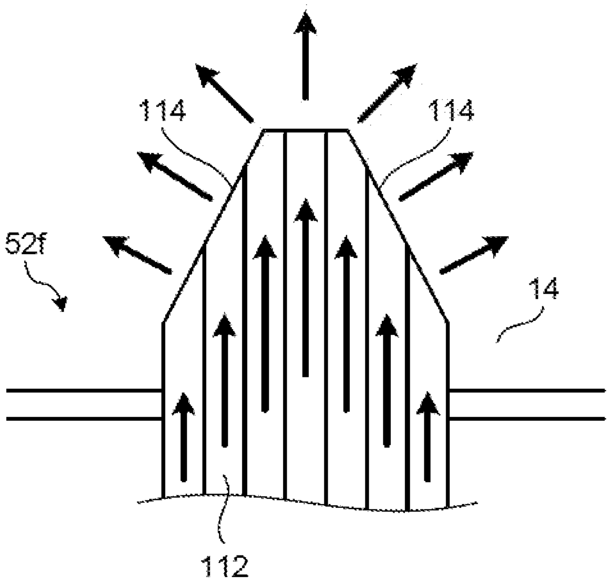
FIG. 9 is a schematic diagram illustrating another example of the heat conductive portion.

FIG. 9 is a schematic diagram illustrating another example of the heat conductive portion. A second heat conductive portion 52*f* illustrated in FIG. 9 illustrates in detail an example of the front-end portion, i.e., the portion corresponding to the end portion 72*a* in FIG. 4. In the second heat conductive portion 52*f*, second members 112 extend in parallel with one another. Ends 114 of the second members 112 extend such that the ends 114 extend farther as the second members 112 are located closer to the center in the arrangement direction of the second members 112. As a result, the second heat conductive portion 52*f* has such a shape that the cross-sectional area thereof is reduced toward the heat exchanger 14. This makes it possible to increase the cross-sectional area of the end portion of the second members 112 having an anisotropic thermal conductivity, thereby making it possible to increase the area capable of exchanging heat with the refrigerant. As a result, heat exchange can be performed more.

Figure 10:
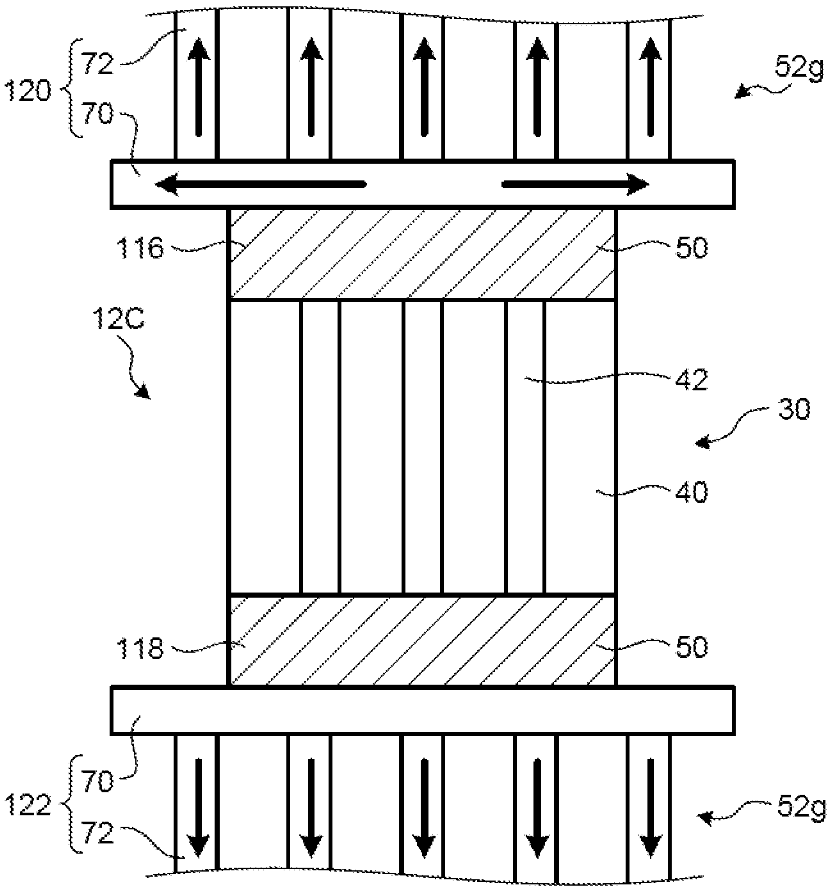
FIG. 10 is a schematic diagram illustrating another example of the heat conductive portion.

In the embodiment, a case is described where the heat conductive portion is provided at one place in a schematic manner. The heat conductive portions may be provided at a plurality of places in the nuclear reactor vessel of the nuclear reactor. FIG. 10 is a schematic diagram illustrating another example of the heat conductive portion. In a nuclear reactor unit 12*c* illustrated in FIG. 10, a heat conductive portion is provided for each of the two surfaces facing each other of the nuclear reactor 30. One heat conductive portion includes a first, heat conductive portion 116 and a second heat conductive portion 120. The other heat conductive portion includes a first heat conductive portion 118 and a second heat conductive portion 122. The first heat conductive portions 116 and 118 have the same structure as the first heat conductive portion 50 does. The second heat conductive portions 120 and 122 are second heat conductive portions 52*g* and each of which has the first member 70 and the multiple second members 72. As described above, the heat conductive portions are provided at a plurality of places, thereby making it possible to recover much more heat.

Figure 11:
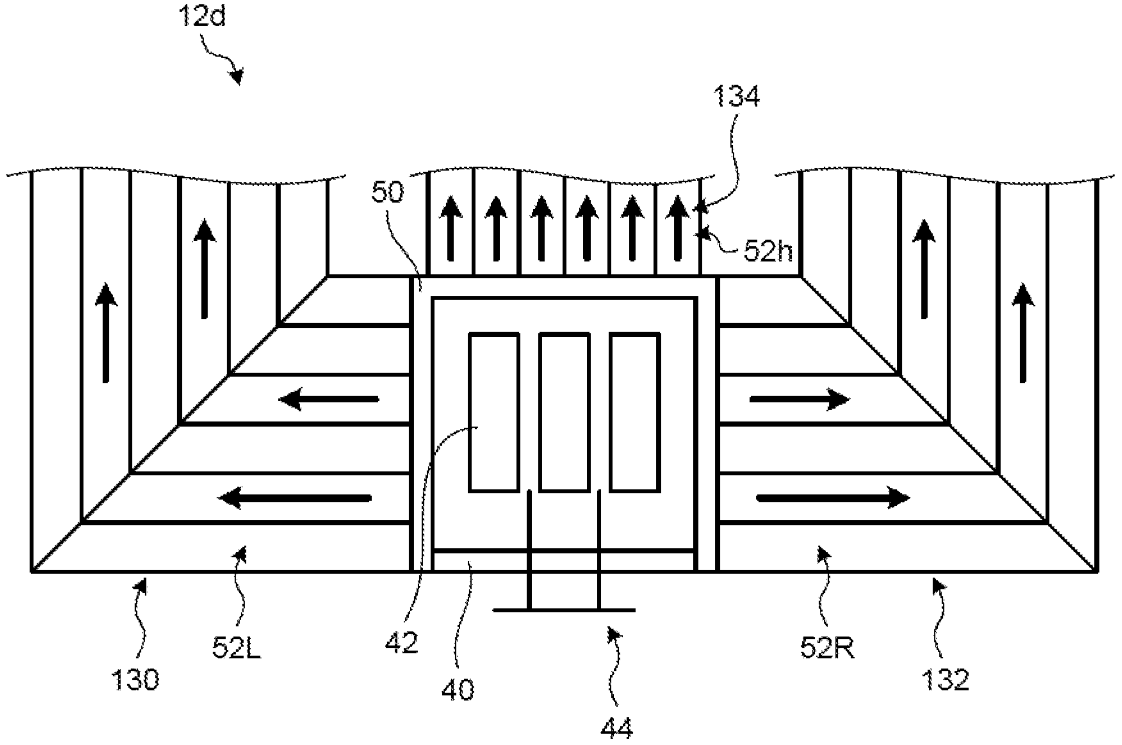
FIG. 11 is a schematic diagram illustrating another example of the heat conductive portion.

FIG. 11 is a schematic diagram illustrating another example of the heat conductive portion. In a nuclear reactor unit 12*d* illustrated in FIG. 11, a heat conductive portion is provided on a plurality of surfaces different from the surface above which the control unit 44 is provided out of the surfaces of the nuclear reactor 30. In the nuclear reactor unit 12*d*, the nuclear reactor vessel 40 is provided on the surface above which the control unit 44 is provided while the first heat conductive portion 50 is provided on the other surfaces. On the surfaces of the first heat conductive portion 50, second heat conductive portions 52L, 52R, and 52*h* are provided. The second heat conductive portions 52L, 52R, and 52*h* have surfaces formed of a plurality of first members 130, 132, and 134, respectively. As described above, no heat conductive portion is provided on the surface above which the control unit 44 is provided, thereby making it possible to simplify the structure. The heat conductive portion is provided on the surfaces other than the surface above which the control unit 44 is provided, thereby making it possible to recover much more heat.

Figure 12:
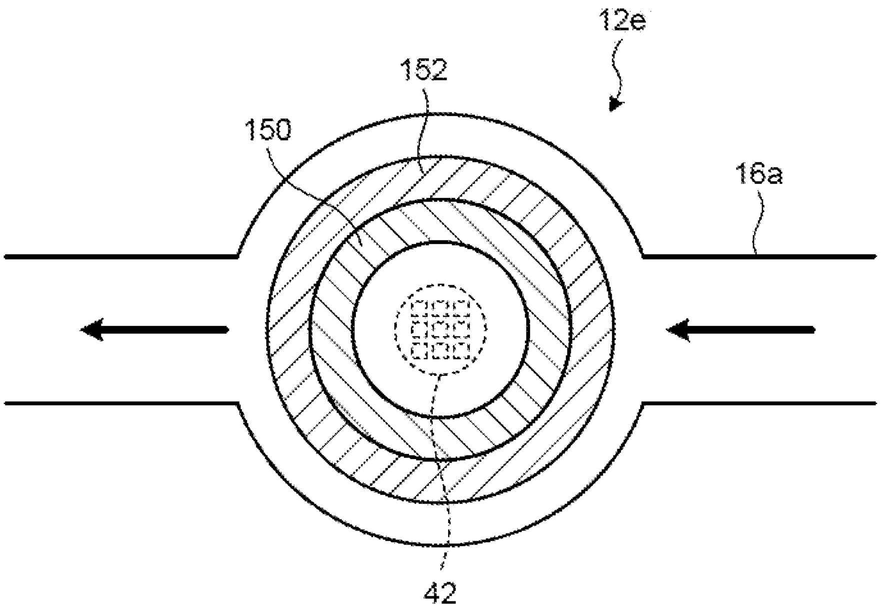
FIG. 12 is a partial cross-sectional view illustrating another example of the nuclear power generation system.
Figure 13:
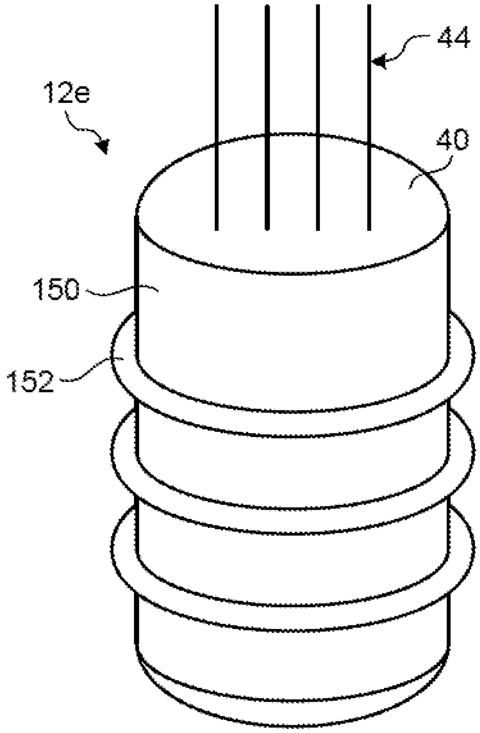
FIG. 13 is a schematic diagram illustrating a schematic structure of the heat conductive portion of the nuclear power generation system illustrated in FIG. 12.
Figure 14:
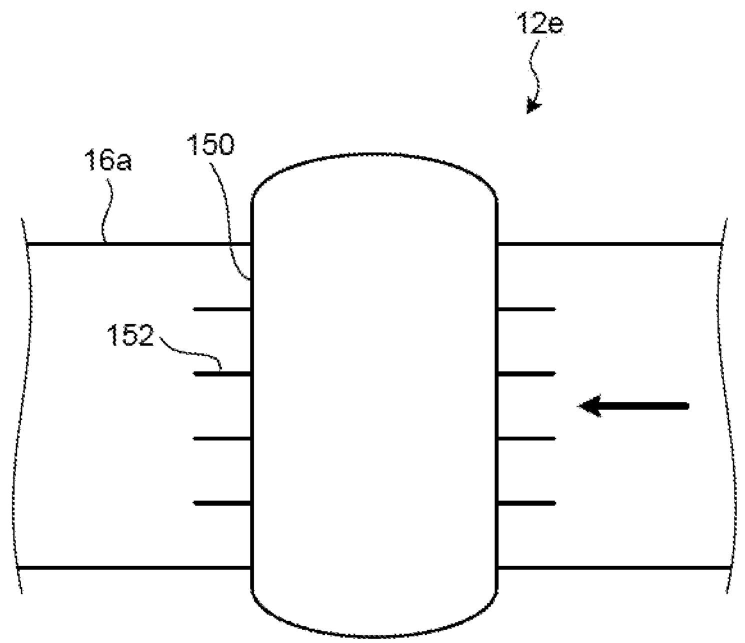
FIG. 14 is a schematic diagram illustrating a flow of a refrigerant in the nuclear power generation system illustrated in FIG. 12.

FIG. 12 is a schematic diagram illustrating another example of the nuclear power generation system. FIG. 13 is a schematic diagram illustrating a schematic structure of the heat conductive portion of the nuclear power generation system illustrated in FIG. 12. FIG. 14 is a schematic diagram explaining a flow of the refrigerant in the nuclear power generation system illustrated in FIG. 12. In a nuclear reactor unit 12*e* illustrated in FIG. 12, the nuclear reactor vessel 40 is a pressure vessel that is shaped in a cylindrical shape provided with sphere shaped portions on the top and bottom thereof. In the nuclear reactor unit 12*e*, the side surface of the cylindrical shape is a first heat conductive portion 150, and a plurality of ring-shaped second heat conductive portions 152 are arranged around the first heat conductive portion 150. The first heat conductive portion 150 has a tubular shape and the second heat conductive portions 152 serve as fins. The nuclear reactor unit 12*e*, thus, has a shape like a fin tube. The nuclear reactor unit 12*e* is provided with a refrigerant circulation unit 16*a* in which the refrigerant passes through on the outer circumference side of the first heat conductive portion 150. As described above, the refrigerant circulation unit 16*a* for the refrigerant is provided in a region covering the outer circumference of the first heat conductive portion 150 in the surrounding of the nuclear reactor vessel 40. This structure, however, can transfer heat by the solid heat conduction and prevent neutron rays inside the nuclear reactor 30 from reaching the refrigerant because the first heat conductive portion 150 transfers heat by the solid heat conduction and has a high neutron shielding performance. The nuclear power generation system 10*e* can further increase the area in an in-plane direction in which the fins of the second heat conductive portions 152 extend. When a material having an anisotropic thermal conductivity such as graphene is used for the second heat conductive portions 152, this structure can further increase the area in the direction in which the thermal conductivity is high, thereby making it possible to further increase the thermal conductivity.

Figure 15:
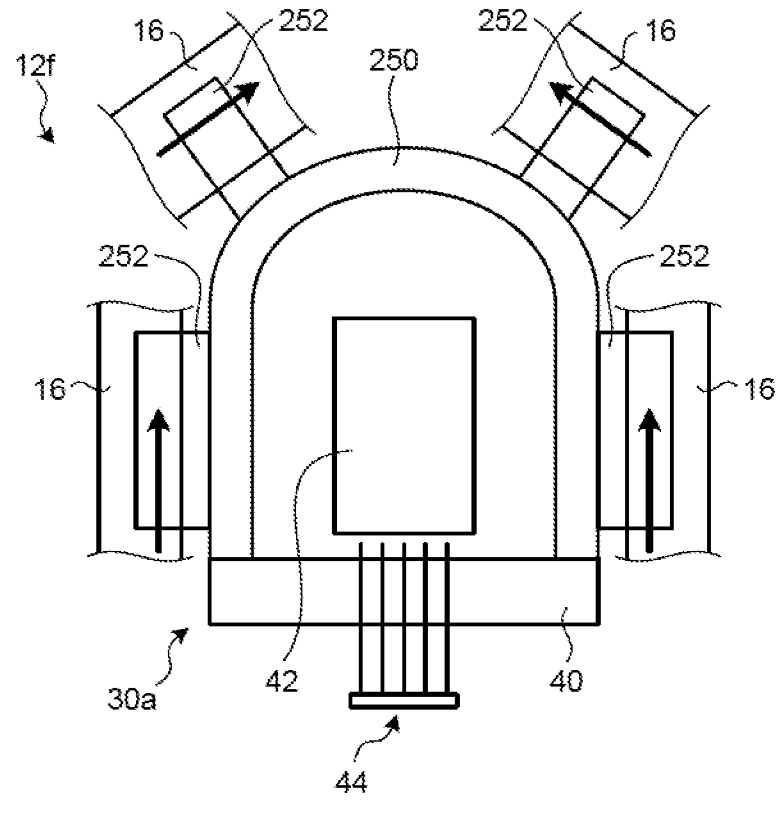
FIG. 15 is a schematic diagram illustrating another example of the nuclear power generation system.

FIG. 15 is a schematic diagram illustrating another example of the nuclear power generation system. In a nuclear reactor unit 12*f* illustrated in FIG. 15, heat conductive portions are provided on a plurality of surfaces different from the surface above which the control unit 44 is provided out of the surfaces of a nuclear reactor 30*a*. In the nuclear reactor unit 12*f*, the nuclear reactor vessel 40 is provided on the surface above which the control unit 44 is provided while a first heat conductive portion 250 is provided on the other surfaces, A second heat conductive portion 252 is disposed along the surface of the first heat conductive portion 250. The refrigerant circulation unit 16 is disposed correspondingly to each of the second heat conductive portions 252. The refrigerant circulation unit 16 may be connected one another or divided one another with different paths. As described above, the refrigerant circulation unit 16 are arranged by being separated from the first heat conductive portion 250, thereby making it possible to prevent more reliably the pollution of the refrigerant.

Figure 16:
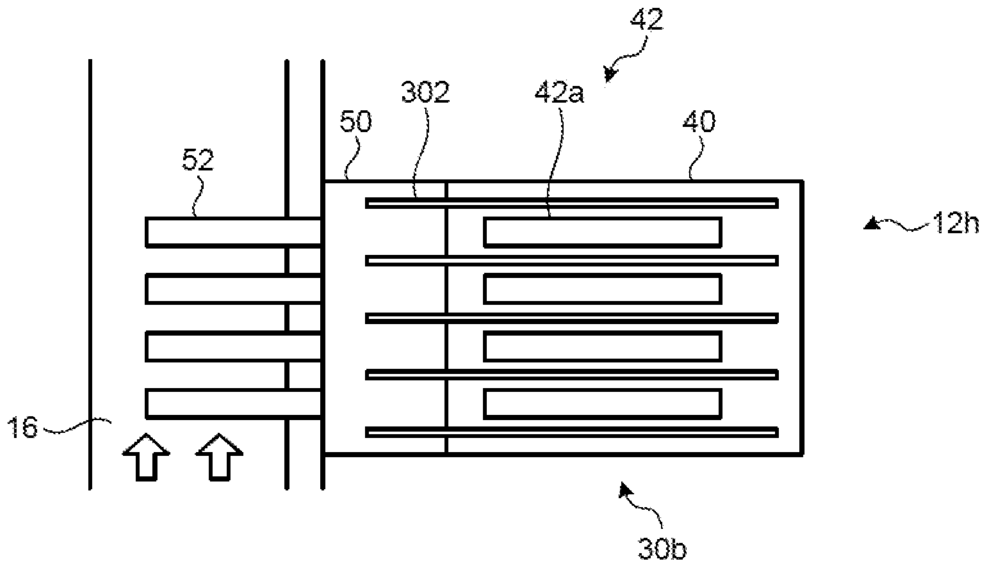
FIG. 16 is a schematic diagram illustrating another example of the nuclear power generation system.

FIG. 16 is a schematic diagram illustrating another example of the nuclear power generation system. A nuclear reactor unit 12*h* illustrated in FIG. 16 has a nuclear reactor 30*b*. The nuclear reactor unit 12*h* has the heat conductive portion including the first heat conductive portion 50 and the second heat conductive portions 52. The nuclear reactor 30*b* includes the nuclear reactor vessel 40, the reactor core fuel 42, and heat pipes 302. The heat pipes 302 are arranged inside the nuclear reactor vessel 40, and a part of each heat pipe 302 is inserted into the first heat conductive portion 50. The heat pipes 302 in the embodiment are arranged between the fuel rods 42*a* of the reactor core fuel 42. The heat pipe 302 is a closed pipeline filled with a heat medium. The heat pipes 302 are arranged in a region having a temperature difference. The heat pipes 302 are heated by heat of the reactor core fuel 42 in a region where the heat pipes 302 are arranged around the reactor core fuel 42. The heated heat medium moves toward the first heat conductive portion 50 side that is a region on a lower-temperature side in the heat pipe 302, to release heat in the first heat conductive portion 50 and then moves toward the reactor core fuel 42 side again. As a result, the heat medium moves inside the heat pipes 302, resulting in the heat pipes 302 transferring heat to the first heat conductive portion 50.

The nuclear reactor 30*b*, which is further provided inside the nuclear reactor vessel with the heat pipes 302, facilitates the transfer of heat of the reactor core fuel 42 to the first heat conductive portion 50 of the heat conductive portion, thereby making it possible to efficiently transfer heat in the nuclear reactor 30*b* to the heat conductive portion. The nuclear reactor unit 12*h* can transfer heat by the heat conductive portion transferring heat to the outside by the solid heat conduction while preventing leakage of radioactive rays.

Figure 17:
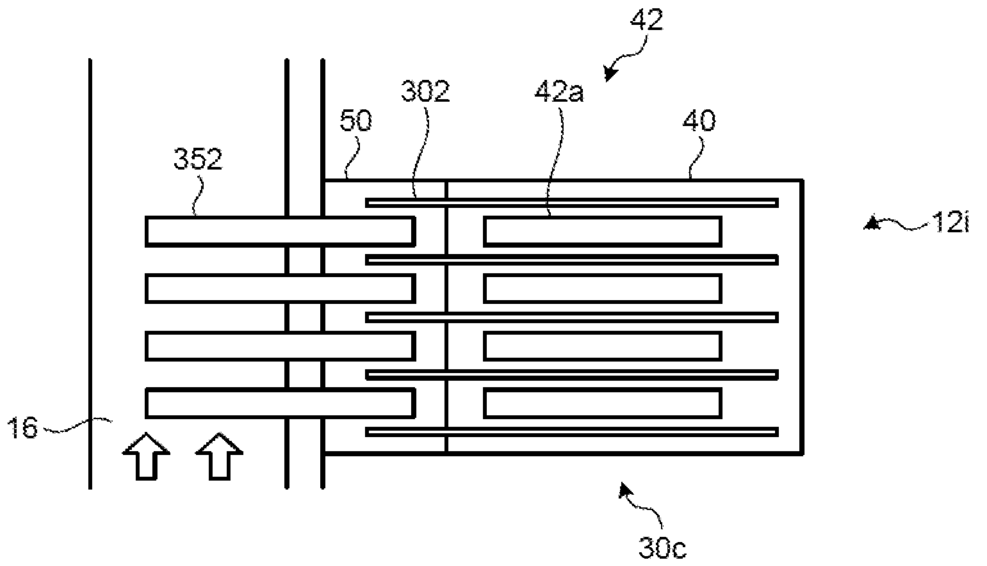
FIG. 17 is a schematic diagram illustrating another example of the nuclear power generation system.

FIG. 17 is a schematic diagram illustrating another example of the nuclear power generation system. A nuclear reactor unit 12*i* illustrated in FIG. 17 has a nuclear reactor 30*c*. The nuclear reactor unit 12*i* has the heat conductive portion including the first heat conductive portion 50 and second heat conductive portions 352. The nuclear reactor 30*c* includes the nuclear reactor vessel 40, the reactor core fuel 42, and the heat pipes 302. The nuclear reactor 30*c* has the same structure as the nuclear reactor 30*b* does in FIG. 16. A part of each of the second heat conductive portions 352 in the embodiment is inserted into the first heat conductive portion 50 provided to a part of the nuclear reactor vessel 40. Both of the heat pipes 302 and the second heat conductive portions 352 of the nuclear reactor 30*c* are inserted into the first heat conductive portion 50. A part of the heat pipe 302 overlaps with the second heat conductive portion 352 in the extending direction. The nuclear reactor unit 12*i* can transfer heat of the heat pipes 302 to the second heat conductive portions 352 with a higher efficiency by inserting the second heat conductive portions 352 having a high thermal conductivity into the first heat conductive portion 50 and overlapping the second heat conductive portions 352 with the heat pipes 302 in the extending direction. The first heat conductive portion 50 provided between the second heat conductive portions 352 can also maintain shielding of radioactive rays.

Figure 18:
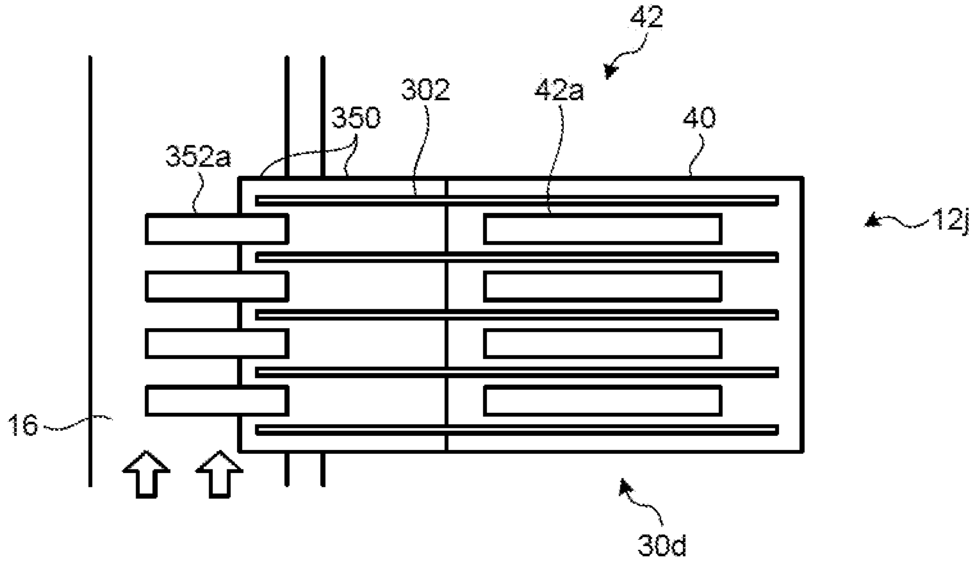
FIG. 18 is a schematic diagram illustrating another example of the nuclear power generation system.

FIG. 18 is a schematic diagram illustrating another example of the nuclear power generation system. A nuclear reactor unit 12*j* illustrated in FIG. 18 has a nuclear reactor 30*d*. The nuclear reactor unit 12*j* has a heat conductive portion including a first heat conductive portion 350 and second heat conductive portions 352*a*. The nuclear reactor 30*d* includes the nuclear reactor vessel 40, the reactor core fuel 42, and the heat pipes 302. The nuclear reactor 30*d* has the same structure as the nuclear reactor 30*b* does in FIG. 16. A part of the first heat conductive portion 350 in the embodiment is inserted into the inside of the refrigerant circulation unit 16. That is, in the embodiment, the first heat conductive portion 350 is in contact with the refrigerant flowing in the refrigerant circulation unit 16. A part of each of the second heat conductive portions 352*a* in the embodiment is inserted into the first heat conductive portion 350 provided to a part of the nuclear reactor vessel 40. The second heat conductive portions 352*a* are arranged inside the refrigerant circulation unit 16.

Both of the heat pipes 302 and the second heat conductive portions 352*a* of the nuclear reactor 30*d* are inserted into the first heat conductive portion 350. A part of the heat pipe 302 overlaps with the second heat conductive portion 352*a* in the extending direction. The heat pipes 302 thus extend up to the inside of the piping of the refrigerant circulation unit 16.

The nuclear reactor unit 12*j* can transfer heat of the reactor core fuel 42 to the refrigerant with a high efficiency by inserting the first heat conductive portion 350 into the refrigerant circulation unit 16 and extending the heat pipes 302 up to the inside of the piping of the refrigerant circulation unit 16 inside the first heat conductive portion 350. In addition, heat of the heat pipes 302 can be transferred to the second heat conductive portions 352*a* with a high efficiency by inserting the second heat conductive portion 352*a* having a high thermal conductivity into the first heat conductive portion 50 and overlapping the second heat conductive portions 352*a* with the heat pipes 302 in the extending direction. The first heat conductive portion 50 is provided around the heat pipes 302, thereby making it possible to maintain shielding of radioactive rays.

REFERENCE SIGNS LIST

10 nuclear power generation system
12 nuclear reactor unit
14 heat exchanger
16 refrigerant circulation unit
18 turbine
20 generator
22 chiller (cooler)
24 pump (compressor
30 nuclear reactor
32 heat conductive portion
40 nuclear reactor vessel
42 reactor core fuel
42*a* fuel rod
44 control unit
50 first heat conductive portion
52 second heat conductive portion

The invention claimed is:

1. A nuclear reactor unit, comprising:
a reactor core fuel;
a nuclear reactor vessel that
surrounds the reactor core fuel; and
shields a space located inside of the nuclear reactor vessel in which the reactor core fuel is present to shield radioactive rays; and
a heat conductor through which heat from the space is transferred to an outside of the nuclear reactor unit by solid heat conduction, wherein
the heat conductor includes a first heat conductor and a second heat conductor, wherein the second heat conductor has a higher thermal conductivity than a thermal conductivity of the first heat conductor,
the first heat conductor has:
a first face exposed to the inside of the nuclear reactor vessel and flush with an inner surface of the nuclear reactor vessel, the first face forming a part of the inner surface of the nuclear reactor vessel such that the heat conductor and the reactor vessel share the first face; and
a second face exposed to outside of the nuclear reactor vessel and flush with an outer surface of the nuclear reactor vessel, the second face forming a part of the outer surface of the nuclear reactor vessel such that the first heat conductor and the nuclear reactor vessel share the second face,
the second heat conductor is disposed outside the nuclear reactor vessel and is in contact with the second face of the first heat conductor,
the first and second heat conductors are both solid, and
the first heat conductor has a thickness equal to a thickness of the nuclear reactor vessel.

2. The nuclear reactor unit according to claim 1, wherein the nuclear reactor vessel is formed of a material having a lower thermal conductivity than the thermal conductivity of the first heat conductor.

3. The nuclear reactor unit according to claim 1, wherein the first heat conductor is formed of a material having a higher neutron shielding performance than a neutron shielding performance of the second heat conductor.

4. The nuclear reactor unit according to claim 1, further comprising a heat pipe that is disposed inside the nuclear reactor vessel, is partly in contact with the first heat conductor, and is filled with a heat medium.

5. The nuclear reactor unit according to claim 1, wherein
the first heat conductor includes graphite, and
the second heat conductor includes graphene.

6. The nuclear reactor unit according to claim 1, wherein the second heat conductor is formed of a material having an anisotropic thermal conductivity.

7. The nuclear reactor unit according to claim 6, wherein the material forming the second heat conductor includes graphene.

8. A nuclear power generation system, comprising:
the nuclear reactor unit according to claim 1;
a heat exchanger that performs heat exchange between the heat conductor and a refrigerant;
a refrigerant circulation unit that circulates the refrigerant through the heat exchanger;
a turbine that is rotated by the refrigerant circulated by the refrigerant circulation unit; and
a generator coupled to the turbine.

9. The nuclear power generation system according to claim 8, wherein the second heat conductor is disposed between the first heat conductor and the refrigerant circulation unit.

10. The nuclear power generation system according to claim 8, wherein the first heat conductor is formed of a material having a higher neutron shielding performance than a neutron shielding performance of the second heat conductor.

11. The nuclear power generation system according to claim 8, wherein the second heat conductor is formed of a material having an anisotropic thermal conductivity.

12. The nuclear power generation system according to claim 11, wherein the material forming the second heat conductor includes graphene.

13. The nuclear power generation system according to claim 8, wherein the second heat conductor has a cross-sectional area that decreases toward the heat exchanger.

14. The nuclear power generation system according to claim 8, further comprising a heat pipe that is disposed inside the nuclear reactor vessel, is partly in contact with the first heat conductor, and is filled with a heat medium.

15. The nuclear power generation system according to claim 8, wherein a part of the second heat conductor is inserted into the heat exchanger.

16. The nuclear power generation system according to claim 8, wherein the nuclear reactor vessel is formed of a material having a lower thermal conductivity than the thermal conductivity of the first heat conductor.

17. The nuclear power generation system according to claim 8, further comprising a plurality of the heat conductors provided at a plurality of positions along the nuclear reactor vessel.

18. The nuclear power generation system according to claim 8, wherein the nuclear reactor unit includes a control unit that controls reaction of the reactor core fuel, and the heat conductor is disposed in a region of the nuclear power generation system that is different from a region of the nuclear power generation system in which the control unit is disposed.

19. A nuclear reactor unit, comprising:

a reactor core fuel;

a nuclear reactor vessel surrounding the reactor core fuel; and a heat conductor through which heat from inside of the nuclear reactor vessel is transferred to outside of the nuclear reactor unit by solid heat conduction, wherein the heat conductor includes a first heat conductor and a second heat conductor, wherein the second heat conductor has a higher thermal conductivity than a thermal conductivity of the first heat conductor, the nuclear reactor vessel has a through hole extending through an entire thickness of the nuclear reactor vessel, the through hole is filled with the first heat conductor, the first heat conductor has a first face exposed to the inside of the nuclear reactor vessel and flush with an inner surface of the nuclear reactor vessel, a second face exposed to outside of the nuclear reactor vessel and flush with an outer surface of the nuclear reactor vessel, and the second heat conductor is disposed outside the nuclear reactor vessel and is in contact with the second face of the first heat conductor.

20. The nuclear reactor unit according to claim 19, wherein the nuclear reactor vessel is formed of a material having a lower thermal conductivity than the thermal conductivity of the first heat conductor.

21. The nuclear reactor unit according to claim 19, wherein the first heat conductor includes graphite, and the second heat conductor includes graphene.

* * * * *